United States Patent [19]

Harianawala

[11] 3,817,956
[45] June 18, 1974

[54] FLOWABLE ISOOLEFIN POLYMERS CONTAINING BROMINE AND PROCESS FOR PRODUCTION THEREOF

[75] Inventor: Abdulhusain Harianawala, Sarnia, Ontario, Canada

[73] Assignee: Polysar Limited-Palysar Limitee, Sarnia, Ontario, Canada

[22] Filed: Jan. 18, 1972

[21] Appl. No.: 218,813

[30] Foreign Application Priority Data
Oct. 28, 1971  Canada .............................. 126303

[52] U.S. Cl. ....... 260/85.3 C, 260/85.3 H, 260/94.8, 260/877
[51] Int. Cl. ...... C08d 3/10, C08d 5/00, C08d 11/00
[58] Field of Search ......... 260/85.3 C, 85.3 H, 94.8, 260/877

[56] References Cited
UNITED STATES PATENTS
3,678,013   7/1972   Minckler, Jr. ................... 260/85.3 C

OTHER PUBLICATIONS

Kennedy & Tornqvist, Polymer Chemistry of Synthetic Elastomers, Part II, 921–923, Interscience, (New York), 1969.

English & Cassidy, Principles of Organic Chemistry, 74–75, McGraw–Hill Book Co., New York, (1956).

*Primary Examiner*—Joseph L. Schofer
*Assistant Examiner*—A. Holler
*Attorney, Agent, or Firm*—Stevens, Davis, Miller & Mosher

[57] ABSTRACT

Brominated isoolefin polymers are ozonized in solution to yield flowable bromine-containing polymers of an isoolefin which may be cured with polyfunctional curing agents.

5 Claims, No Drawings

FLOWABLE ISOOLEFIN POLYMERS CONTAINING BROMINE AND PROCESS FOR PRODUCTION THEREOF

This invention is directed to a process for the production of a bromine-containing, flowable polymer of isobutylene and to the product of said process, said flowable polymer being capable of being cured with polyfunctional curing agents.

It is well known that butyl rubber type polymers, which contain a major proportion of an isoolefin having from four to six carbon atoms and a minor proportion of a copolymerized conjugated diolefin having from four to eight carbon atoms, can be reacted with an ozone-containing mixture to cause the rupture of the carbon-carbon double bonds within the polymer molecule to produce low molecular weight polymers having attached thereby carboxyl and/or hydroxyl groups. In order to produce the desired end product, only specific types of conjugated diolefin-containing polymers may be used as the starting butyl rubber type polymer or the steps subsequent to the ozonolysis must be numerous or expensive.

The process of the invention is directed to the production of a reactive bromine-containing flowable polymer of a $C_4 - C_6$ isoolefin comprising the steps of treating in solution in an inert solvent with an ozone-containing gas a high molecular weight polymer having a major proportion of polymerized $C_4 - C_6$ isoolefin and a minor proportion of copolymerized $C_4 - C_6$ conjugated diolefin units, said diolefin units being brominated, and to recovering the flowable polymer, wherein the majority of the molecules of said flowable polymer contain at least two separated reactive groups, at least one of said reactive groups being essentially terminal, a first reactive group containing a bromine atom and a second reactive group being carboxyl acid, and to the product obtained by such a process.

The manufacture of butyl rubber type polymers is well known in the art. A major proportion of an isoolefin containing four to six carbon atoms is admixed with a minor proportion of a conjugated diolefin containing four to eight carbon atoms, such that of the mixture the isoolefin constitutes from about 65 to about 99.5 weight per cent and the conjugated diolefin constitutes from about 0.5 to about 35 weight per cent, and is polymerized in the presence of a Friedel Crafts catalyst such as aluminum chloride at a temperature of from about $-50°$ C to about $-150°$ C, said polymerization usually being in the presence of an inert diluent such as methyl chloride. The recovered polymer generally has a molecular weight from about 100,000 to about 1,500,000 and an unsaturation level from about 0.25 to about 15 mole per cent.

The halogenation of such butyl rubber type polymers is well known in the art and may be achieved by treating the butyl rubber type polymer with a suitable quantity of an halogenating agent. The halogen of such halogenated butyl rubber type polymers is preferably selected from chlorine and bromine. One particular butyl rubber type polymer is that known as butyl rubber and containing isobutylene and isoprene; a halogenated polymer derived therefrom and containing bromine is known as bromobutyl.

In the process of this invention, a high molecular weight brominated butyl rubber type polymer is subjected to ozonolysis. The high molecular weight brominated butyl rubber type polymer contains a major proportion of a $C_4 - C_6$ isoolefin and a minor proportion of a $C_4 - C_6$ conjugated diolefin, the diolefinic units being brominated. A preferred process of this invention uses bromobutyl as the high molecular weight polymer which is subjected to ozonolysis. In a preferred process of preparing bromobutyl, which process does not constitute part of this invention, butyl rubber containing from about 95 mole per cent to about 99.5 mole per cent of isobutylene and from about 5 mole per cent to about 0.5 mole per cent of isoprene is dissolved in a pure solvent, preferably an aliphatic solvent such as hexane, and liquid bromine, optionally dissolved in a like solvent, is added to the stirred rubber solution. After neutralization of the hydrobromic acid formed, the bromobutyl is recovered such as by precipitation from the solvent by the addition of an alcohol or by contacting the solution with hot water to cause vapourization of the solvent and the formation of rubber crumb in water, the water-wet rubber then being dried. The bromobutyl so produced may contain from about 1 weight per cent to about 12 weight per cent bromine, preferably from about 1.5 weight per cent to about 7.5 weight per cent bromine. The brominated polymer generally contains not less than 1 and not more than 2 bromine atoms per conjugated diolefin unit of the bromobutyl. In a preferred process of this invention, bromobutyl is dissolved in an inert solvent. The concentration of rubber dissolved in the solvent may be as low as 1 per cent by weight and as high as 30 per cent by weight, preferably being from about 5 to about 15 weight per cent. Suitable solvents include the saturated aliphatic hydrocarbons such as hexane, heptane and isohexane, carbon tetrachloride and any other solvent which is inert under the conditions of ozonolysis hereinafter described. The solution is maintained at an essentially constant temperature of from about $-80°$ C to about $60°$ C, preferably from about $0°$ C to about $45°$ C. Ozone is bubbled through the solution. The ozone may be essentially pure ozone but is preferably an ozone-oxygen gas mixture as generated in commercially available ozone generators. The ozone concentration of said gas mixture may be from about 0.5 per cent to about 8 per cent by volume and most often is from about 2 per cent to about 4 per cent by volume. The pressure of the gas mixture may be from atmospheric pressure up to about 50 psi, preferably from about 2 psi to about 10 psi. The minimum quantity of ozone to be added to the solution may be readily calculated from a knowledge of the amount of unsaturation (carbon-carbon double bonds) in the polymer, the quantity of polymer to be treated and the desired molecular weight of the flowable polymer to be produced, assuming that one molecule of ozone will react with one carbon-carbon double bond. From a knowledge of the ozone concentration in the gas mixture and the volume flow rate of the ozone gas mixture, the quantity of ozone added to the solution per unit time may be calculated. From these data, the minimum length of time that the ozone gas mixture is added to the solution may be determined. Some excess ozone is usually added to ensure efficient breakdown of the high molecular weight polymer to the flowable polymer. The time for which the ozone mixture is bubbled through the solution may be from about 5 minutes up to about 24 hours.

After ozonolysis the solvent is removed to yield a flowable polymer. Alternatively, on completion of the ozonolysis, the polymer solution may be further treated with a reagent selected from water, aqueous solutions of inorganic acids and the lower molecular weight alcohols such as ethanol and propanol. The preferred reagent is water. The reagent is admixed with the ozonized polymer solution in such a way as to promote efficient reaction with the ozonized polymer, including turbulent agitation, heating or both agitation and heating. The polymer solution is then separated from the aqueous phase and the flowable polymer is recovered by removal of the solvent.

The simplicity of the process of this invention is readily seen from the prior description. Following the ozonolysis of a commercially available polymer, removal of the solvent only is necessary to yield the reactive flowable polymer. Optionally, the ozonized polymer solution may be subjected to a simple treatment with, for example, water before the flowable polymer is recovered. In the prior art, special polymers were necessary for the ozonolysis and complicated treatments had to be undertaken of the ozonized polymer prior to recovery of the final flowable polymer in order that the polymer would be useful.

The flowable polymers of this invention are low molecular weight polymers, generally having a molecular weight of from about 12,000 to about 1,000, as measured by vapour pressure osmometry, a preferred molecular weight range being from about 6,000 to about 2,000. The molecular weight range of about 12,000 to about 1,000 generally corresponds to the molecular weight of polymers obtained by the complete ozonolysis of high molecular weight polymers containing from about 0.5 to about 5 mole percent unsaturation, although complete ozonolysis of the high molecular weight polymer is not essential in the process of this invention. Polymers with molecular weights above about 12,000 are difficult to process due to high bulk viscosity. Polymers with molecular weights below about 1,000 generally do not contribute sufficient strength to the material in its final end use application. The bulk viscosity of the flowable polymer depends on the molecular weight of the polymer and can be in the range of from about 200 poise to at least 2,000 poise as measured at 50° C with a Brookfield viscometer.

In order that the polymers of this invention be curable it is necessary for them to possess at least two separated reactive groups which can react with suitable curing agents, one such reactive group containing a bromine atom. A preferred reactive group is one in which bromine is attached to a carbon atom also having attached thereto a carbonyl group. The bromine content of the polymer of this invention is from 1 to not more than 3 bromine atoms per polymer molecule. For polymers of the molecular weight range 1,000 to 12,000 and containing from 1 to not more than 3 bromine atoms per molecule, a corresponding range is a bromine content of about 0.5 to about 24 weight per cent and for the preferred polymer molecular weight range of about 2,500 to about 6,000, the corresponding bromine content is about 1.25 to about 9 weight per cent. The bromine content of the polymer may be determined by any convenient chemical analytical means and the number of bromine atoms per polymer molecule may be calculated knowing also the molecular weight of the polymer. A second such reactive group of the polymer is the carboxyl acid group. The carboxyl acid content of the polymer of this invention is from 1 carboxyl acid group to about 1.5 carboxyl acid groups per average polymer molecule. An alternative means of expressing said carboxyl acid content is from about 1.5 $\times 10^{-2}$ equivalents of carboxyl acid per 100 grams of polymer to about $5 \times 10^{-2}$ equivalents of carboxyl acid per 100 grams of a polymer. The carboxyl acid content of the polymer may be determined by titration to a suitable end point against a standard solution of a base such as alcoholic potassium hydroxide. It is essential that the majority of molecules of the flowable polymer contain at least two separated reactive groups, a first reactive group containing a bromine atom and a second reactive group being carboxyl acid in order that the polymer may be useful. Other molecules of the flowable polymer, i.e. the minority of the polymer molecules, may be deficient in either one or both of bromine content and carboxyl acid content without interfering seriously with the usefulness of the whole polymer.

The structure of halogenated butyl polymers is well known to include polymerized conjugated diolefin units in which the halogen has been incorporated by a substitutive process yielding an allylic halide structure and to include polymerized conjugated diolefin units in which the halogen has been incorporated by addition across the carbon-carbon double bond. The cure activity of chlorinated and brominated butyl is known to be due, at least in part, to the presence of the allyl chloride and allyl bromide groups in the polymer molecule. Thus the following structures A, B, C and D are known to be present at the polymerized conjugated diolefinic units of bromobutyl:

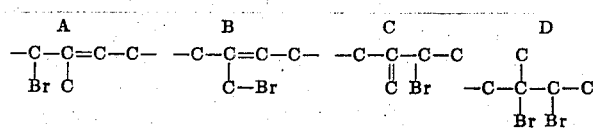

wherein structures A, B and C show the bromine to be in an allylic bromide structure, said structures probably being formed by a substitutive reaction of bromine replacing a hydrogen atom of the isoprene of the butyl rubber molecule. On the other hand, Structure D contains no unsaturation, has two bromine atoms per isoprene molecule and was probably formed by addition of a bromine molecule or two bromine atoms to the originally present carbon-carbon double bond of the polymerized isoprene unit. Structures B and C, with chlorine in place of bromine, were shown to be present in chlorobutyl in the article by I. C. McNeill in Polymer, 1963, Volume 4, pp. 15-25, especially at page 24 thereof. Ozonolysis of bromobutyl rubber containing Structure D will show no change in the polymer molecule at the point where Structure D occurs. Ozonolysis and recovery of the ozonized polymer from bromobutyl rubber containing Structures A, B and C would yield polymer molecules containing, due to the rupture of the carbon-carbon double bonds, at least the following groups:

from Structure A
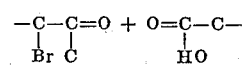

from Structure B
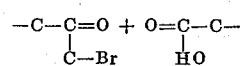

from Structure C

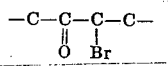

The reactive groups of the polymers formed from the ozonolysis of bromobutyl include terminal carboxyl acid, essentially terminal bromine attached to a carbon atom also having attached thereto a carbonyl group and bromine attached to carbon atoms. Ozonolysis of bromobutyl rubber containing structures A and B will result in the recovered polymer being of lower molecular weight than the molecular weight of the original bromobutyl rubber.

The fact that the polymers of this simplified process are useful is demonstrated by the curing of the flowable polymers of this invention to yield a product suitable for use in the fields of, for example, caulks, sealants and mastics. The flowable polymers are curable by reaction with polyfunctional curing agents which are capable of reacting with carboxyl groups and with bromine groups. Such curing agents include compounds containing amine groups, imine groups, aziridinyl groups, isocyanate groups, epoxide groups or mixtures of such groups. Such polyfunctional curing agents contain at least two and preferably three or more groups as hereinbefore defined. Preferred curing agents include the organic polyisocyanate compounds, organic polyimine compounds and polyaziridinyl compounds. Most preferred curing agents are toluene diisocyanate and tris-[1(2 methyl)-aziridinyl] phosphite. The reaction of the curing agent with the flowable polymer, after admixture therewith, may be undertaken at any suitable termperature from room temperature up to about 350° F for sufficient time to cause the formation of a vulcanizate of desired properties. Preferred temperatures are from about 150° F to about 250° F, for times from about 6 hours to about 48 hours. The product obtained by the curing reaction of a polyfunctional curing agent with the flowable polymer of the invention is substantially insoluble in hydrocarbon solvents. It is within the scope of the invention to incorporate additives and fillers into the flowable polymer-curing agent mixture.

The following examples serve to illustrate the invention but do not limit the scope of the invention.

EXAMPLE 1

The bromobutyl of this example was a polymer containing 5.3 weight per cent bromine, about 3 mole per cent unsaturation and had a Mooney (ML 1 + 8 at 212° F) of about 45. 300 grams of the bromobutyl polymer were dissolved in 3,000 mls pure hexane; the solution was transferred to a reaction vessel equipped with a stirrer, a gas inlet tube and a gas removal line, the latter being directly connected to gas bubblers containing an aqueous solution of potassium iodide. A source of gaseous ozone in oxygen was connected to the gas inlet tube and ozone, at a concentration of approximately 5 × 10⁻² moles per hour in oxygen, was passed into the solution of bromobutyl for a total time of 12 hours. At the end of the 12 hours the ozone content of the gas stream was reduced to zero and oxygen was passed through the solution for 20 minutes in order to remove any traces of unreacted ozone. 200 mls of the ozonized bromobutyl solution were transferred to a distillation flask and the bulk of the hexane was removed by distillation. The polymer-rich residue was transferred to a vacuum oven where the residual hexane was removed under vacuum at 125° F. The polymer so recovered was found to contain 4.3 weight per cent bromine and $2.12 \times 10^{-2}$ equivalents of COOH per 100 grams of polymer. The molecular weight (number average) as determined in a vapour pressure osometer was 3335. From the weight per cent bromine and the molecular weight, the number of bromine atoms per polymer molecule is calculated to be 1.8. 5 grams of the ozonized bromobutyl polymer were mixed on a flat dish with a spatula with 0.75 grams of tris[1-(2 methyl)-aziri-dinyl] phosphite as curative, the mixing being continued until both components were well interdispersed. The compounded polymer was transferred to a mold coated with Teflon, care being taken to thoroughly fill the cavity of the mold and to exclude air bubbles. The mold was transferred to an oven maintained at 212° F for 24 hours. Tensile test strips were cut out from the vulcanized sheets and the stress strain properties were found to be:

| | |
|---|---|
| tensile strength | 27 kg/cm² |
| elongation at break | 320% |
| modulus at 300% elongation | 24 kg/cm² |

The vulcanized polymer was found to be 91 percent insoluble in cyclohexane.

The ozonized bromobutyl polymer so prepared possesses properties that make it desirable for use in caulk, sealant and mastic applications and can readily be cured to yield vulcanizates of sufficient strength for such, and similar, applications.

EXAMPLE 2

80 grams of bromobutyl, containing 5.5 weight per cent bromine, were dissolved in 800 mls of pure hexane and subjected to ozonolysis, as described in Example 1, except that the time for the passage of the ozone-oxygen stream was 5 hours. Following the ozonolysis, oxygen gas was bubbled through the ozonized bromobutyl solution for 20 minutes in order to remove any dissolved ozone. 800 milliliters of water were added and the mixture was heated under reflux for one hour. After cooling, the aqueous phase was decanted off and the solution dried over molecular sieves. The bulk of the solvent was removed by distillation and the recovered polymer was finally dried in a vacuum oven at a temperature of 125° F. The recovered polymer contained 4.3 weight per cent bromine, $2.64 \times 10^{-2}$ equivalents of COOH per 100 grams of polymer and had a number average molecular weight of 2,700. By calculation as in Example 1, the number of bromine atoms per polymer molecule is found to be about 1.5. The bulk viscosity of the flowable polymer was 308 poise at 50° C.

The ozonized bromobutyl polymer was compounded by mixing with tris[1-(2 methyl)-aziridinyl] phosphite, in the quantities indicated in Table I. The compounded polymer was transferred to a Teflon mold and cured for 24 hours at 212° F. The stress strain properties of the vulcanizates are given in Table I.

Table I

| Compound | | A | B |
|---|---|---|---|
| Wt. of ozonized bromobutyl | g | 5.011 | 5.014 |
| Wt. of tris[1-(2 methyl)-aziridinyl] phosphite | g | 0.502 | 0.753 |

Table I-Continued

| Compound | | A | B |
|---|---|---|---|
| Vulcanizate properties | | | |
| Modulus at 300% elongation | kg/cm² | 5.0 | 7.5 |
| Tensile strength | kg/cm² | 7.0 | 12.0 |
| Elongation at break | % | 510 | 490 |

In a separate experiment, 5.002 grams of the ozonized bromobutyl were mixed with 0.50 grams of polyethylene imine. The mixture set up during the mixing to yield a hexane insoluble vulcanizate.

EXAMPLE 3

200 grams of a bromobutyl containing 5.1 weight per cent bromine were dissolved in 2 litres of pure hexane and subjected to ozonolysis, as in Example 1, for a time of 8 hours. After removal of dissolved ozone from the solution, the polymer solution was transferred to a vacuum distillation unit in which the hexane solvent was removed. The resultant polymer contained 4.72 weight per cent bromine, $2.94 \times 10^{-2}$ equivalents of COOH per 100 grams of polymer and had a molecular weight of 5,060 as measured by vapor pressure osmometry. The bulk viscosity of the polymer was 1,630 poise as measured at 50° C. One portion of the ozonized bromobutyl was compounded with toluene di-isocyanate and a second portion of the polymer was compounded with tris[1-(2 methyl)-aziridinyl] phosphite, the recipes used and vulcanizate properties being recorded in Table II. The properties determined for the vulcanizates demonstrate that the ozonized bromobutyl cured readily and would be suitable for a range of applications including curable caulks, mastics and sealants.

Table II

| Compound | | A | B | C |
|---|---|---|---|---|
| Wt. of ozonized bromobutyl | g | 5.00 | 5.03 | 5.00 |
| Wt. of toluene di-isocyanate | g | 0.31 | — | — |
| Wt. of tris[1-(2 methyl)-aziridinyl] phosphite | g | — | 0.50 | 0.76 |
| Vulcanization time hours | | 24 | 24 | 24 |
| Vulcanization temperature °F | | 250 | 212 | 212 |
| Vulcanizate properties | | | | |
| Tensile strength | kg/cm² | 3.0 | 12 | 19 |
| Modulus at 300% elongation | kg/cm² | 3.0 | 7 | 10 |
| Elongation at break | % | 305 | 580 | 550 |
| Insolubility in cyclohexane | % | — | 74 | 87 |

EXAMPLE 4 (COMPARATIVE)

210 grams of a commercial chlorobutyl which contained 1.4 weight per cent chlorine were dissolved in 2,100 mls of pure hexane and ozonized, as in Example 1, for 6 hours. After purging the solution for 10 minutes with oxygen gas to remove dissolved ozone the solution was washed with three successive portions of distilled water. After drying the solution over molecular sieves, the hexane was removed from the solution by distillation and the polymer finally dried in a vacuum oven at 125° F. The ozonized chlorobutyl contained 1.4 weight per cent chlorine and $1.78 \times 10^{-2}$ equivalents of COOH per 100 grams of polymer. The molecular weight was determined by vapor pressure osmometry to be 6,310. Various quantities of the ozonized chlorobutyl were mixed with toluene di-isocyanate and with tris[1-(2 methyl)-aziridinyl] phosphite to yield compounds containing 8 or 12 weight per cent of the former or 10, 15 or 20 weight per cent of tris[1-(2 methyl)-aziridinyl] phosphite. These compounds were heated at 250° F for 24 and 48 hours for the di-isocyanate containing compounds and at 212° F for 24 and 48 hours for the aziridinyl phosphite compounds but in no instance was a cure achieved.

What is claimed is:

1. The process of producing a cured polymer wherein a flowable polymer is reacted with a polyfunctional curing agent selected from an organic polyisocyanate compound, a polyaziridinyl compound and an organic polyimine compound, said cured polymer being substantially insoluble in hydrocarbon solvents, wherein said flowable polymer is produced by treating in solution with an ozone containing gas a high molecular weight polymer having a major proportion of polymerized $C_4$-$C_6$ isoolefin and a minor proportion of copolymerized $C_4$-$C_6$ conjugated diolefin units, said diolefin units being brominated and containing at least one or both of the structures

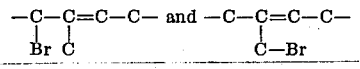

the majority of the molecules of said flowable polymer containing at least two separated reactive groups at least one of which is essentially terminal, a first reactive group containing a bromine atom and a second reactive group being carboxyl acid.

2. The process of claim 1 wherein the ozone treated polymer in solution is contacted with water prior to recovery of the flowable polymer.

3. The process of claim 1 wherein the isoolefin of the high molecular weight polymer is isobutylene and the conjugated diolefin is isoprene, said isobutylene being from about 95 to 99.5 mole per cent and said isoprene being from about 5 to 0.5 mole per cent of said high molecular weight polymer.

4. The process of claim 3 wherein the high molecular weight polymer contains from about 1 to about 12 weight per cent of bromine and said flowable polymer has a molecular weight of from about 1,000 to about 12,000.

5. The process of claim 1 wherein said polyfunctional curing agent is selected from toluene di-isocyanate and tris[1-(2 methyl)-aziridinyl] phosphite.

* * * * *